US012240551B2

(12) United States Patent
Keller

(10) Patent No.: US 12,240,551 B2
(45) Date of Patent: Mar. 4, 2025

(54) STEERING METHOD AND STEERING SYSTEM FOR AN INDUSTRIAL TRUCK

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 555 days.

(21) Appl. No.: 17/603,585

(22) PCT Filed: Mar. 12, 2020

(86) PCT No.: PCT/EP2020/056616
§ 371 (c)(1),
(2) Date: Oct. 14, 2021

(87) PCT Pub. No.: WO2020/212028
PCT Pub. Date: Oct. 22, 2020

(65) Prior Publication Data
US 2022/0194465 A1    Jun. 23, 2022

(30) Foreign Application Priority Data
Apr. 16, 2019  (DE) .................... 10 2019 109 995.1

(51) Int. Cl.
*B62D 7/15* (2006.01)
*B62D 5/04* (2006.01)
(Continued)

(52) U.S. Cl.
CPC ............. *B62D 7/1509* (2013.01); *B62D 5/04* (2013.01); *B62D 6/00* (2013.01); *B62D 5/0442* (2013.01); *B66F 9/07568* (2013.01)

(58) Field of Classification Search
CPC ................................................. B62D 7/1509
See application file for complete search history.

(56) References Cited

U.S. PATENT DOCUMENTS 11,097,773 B2 * 8/2021 Kim ...................... B62D 5/0484
2003/0105563 A1    6/2003 Oshima et al.
(Continued)

FOREIGN PATENT DOCUMENTS

DE          43 03 342 A1    8/1994
DE         101 44 372 A1    4/2003
(Continued)

OTHER PUBLICATIONS

Machine Translation of DE4303342A1 (Year: 1994).*

*Primary Examiner* — Kevin Hurley
(74) *Attorney, Agent, or Firm* — Norman B. Thot

(57) ABSTRACT

A steering method of an industrial truck. The industrial truck comprises a drive, at least three steerable wheels, at least one steering setpoint value transmitter which steers at least one of the at least three steerable wheels, a steering computer which provides angle setpoint values, and an electrical power electronics unit which supplies electrical energy to a steering motor associated with the at least one steered wheel. The method comprises steering, via the at least one steering setpoint value transmitter, the at least one steered wheel, detecting angular positions of the at least one steered wheel, providing the angle setpoint values via the steering computer, comparing the angular positions of the at least one steered wheel with the angle setpoint values provided via the steering computer so as to determine a setpoint/actual value difference, and controlling the electrical power electronics unit based on the setpoint/actual value difference.

19 Claims, 11 Drawing Sheets

(51) Int. Cl.
*B62D 6/00* (2006.01)
*B66F 9/075* (2006.01)

(56) References Cited

U.S. PATENT DOCUMENTS

| | | |
|---|---|---|
| 2015/0353130 A1 | 12/2015 | Keller |
| 2019/0168806 A1 | 6/2019 | Liu |
| 2022/0126914 A1* | 4/2022 | Park ........................ B60K 35/22 |
| 2023/0227102 A1* | 7/2023 | Kim ........................ B62D 6/003 |
| | | 701/41 |

FOREIGN PATENT DOCUMENTS

| | | | |
|---|---|---|---|
| DE | 10 2004 055 282 A1 | 6/2006 | |
| DE | 10 2012 112 743 A1 | 6/2014 | |
| EP | 2 253 528 A2 | 11/2010 | |
| WO | WO 2018/028495 A1 | 2/2018 | |
| WO | WO-2020212028 A1 * | 10/2020 | ............... B62D 5/04 |

\* cited by examiner

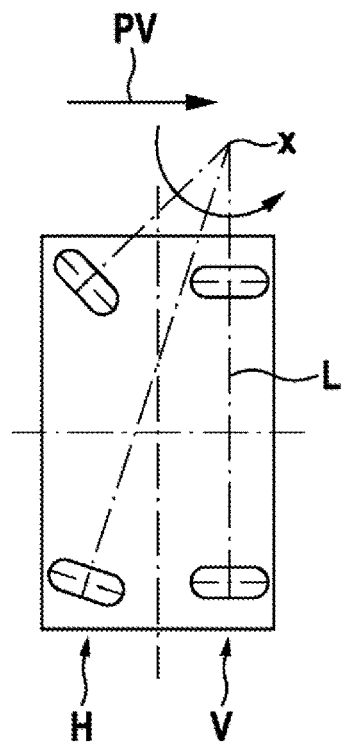
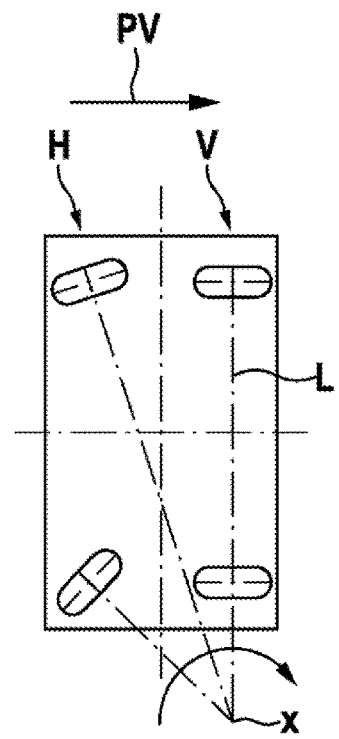
Fig. 18   Fig. 19
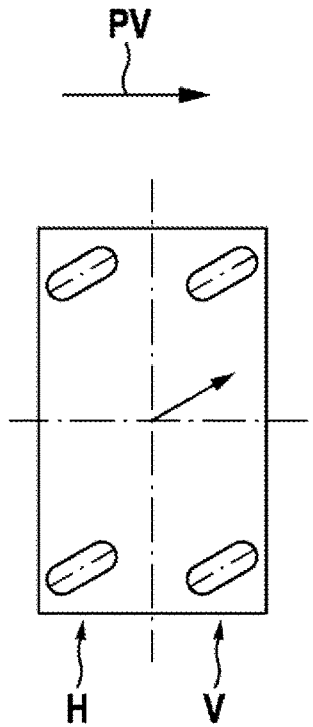
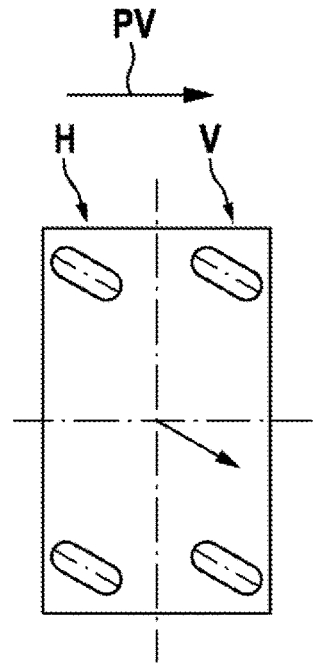
Fig. 20   Fig. 21

STEERING METHOD AND STEERING SYSTEM FOR AN INDUSTRIAL TRUCK

CROSS REFERENCE TO PRIOR APPLICATIONS

This application is a U.S. National Phase application under 35 U.S.C. § 371 of International Application No. PCT/EP2020/056616, filed on Mar. 12, 2020 and which claims benefit to German Patent Application No. 10 2019 109 995.1, filed on Apr. 16, 2019. The International Application was published in German on Oct. 22, 2020 as WO 2020/212028 A1 under PCT Article 21(2).

FIELD

The present invention relates to a steering method of an industrial truck comprising a drive and having at least three motorized steerable wheels, with at least one of the at least three steerable wheels being steered via a steering setpoint value transmitter, and the angular positions of the at least one steered wheel of the at least three steerable wheels being detected and compared with angle setpoint values provided by a steering computer. The present invention also relates to a steering system for an industrial truck having a drive comprising at least three steerable wheels, having a steering setpoint value transmitter and at least three steering motors for steering a steerable wheel in each case. The present invention also relates to an industrial truck equipped with such a steering system.

BACKGROUND

Hydraulically operating steering methods and steering systems in industrial trucks have previously been described. Hydraulically operating steering methods and steering systems have the disadvantage that different steering programs, for example, for operating the industrial truck in longitudinal, transverse, or diagonal travel, can only be implemented with considerable design effort. The energetic efficiency of these steering methods and steering systems is poor due to a constantly running hydraulic pump, and the noise level is high. The manufacturing effort required for the necessary hydraulic piping is also considerable.

SUMMARY

An aspect of the present invention is to provide a steering method and a steering system for industrial trucks with at least three steerable wheels which are improved with regard to at least one of these disadvantages.

In an embodiment, the present invention provides a steering method of an industrial truck. The industrial truck comprises a drive, at least three steerable wheels, at least one steering setpoint value transmitter which is configured to steer at least one of the at least three steerable wheels, a steering computer which is configured to provide angle setpoint values, and an electrical power electronics unit which is configured to supply an electrical energy to a steering motor which is associated with the at least one steered wheel of the at least three steerable wheels. The method comprises steering, via the at least one steering setpoint value transmitter, at least one steered wheel of the at least three steerable wheels, detecting angular positions of the at least one steered wheel of the at least three steerable wheels, providing the angle setpoint values via the steering computer, comparing the angular positions of the at least one steered wheel of the at least three steerable wheels with the angle setpoint values provided via the steering computer so as to determine a setpoint/actual value difference, and controlling the electrical power electronics unit based on the setpoint/actual value difference.

BRIEF DESCRIPTION OF THE DRAWINGS

The present invention is described in greater detail below on the basis of embodiments and of the drawings in which:

FIG. 18 shows a first view of the functionality of a "rear-axle steering, longitudinal travel" steering program;

FIG. 19 shows a second view of the functionality of a "rear-axle steering, longitudinal travel" steering program;

FIG. 20 shows a first view of the functionality of a "diagonal steering, longitudinal travel" steering program;

FIG. 21 shows a second view of the functionality of a "diagonal steering, longitudinal travel" steering program;

DETAILED DESCRIPTION

Figure 1:
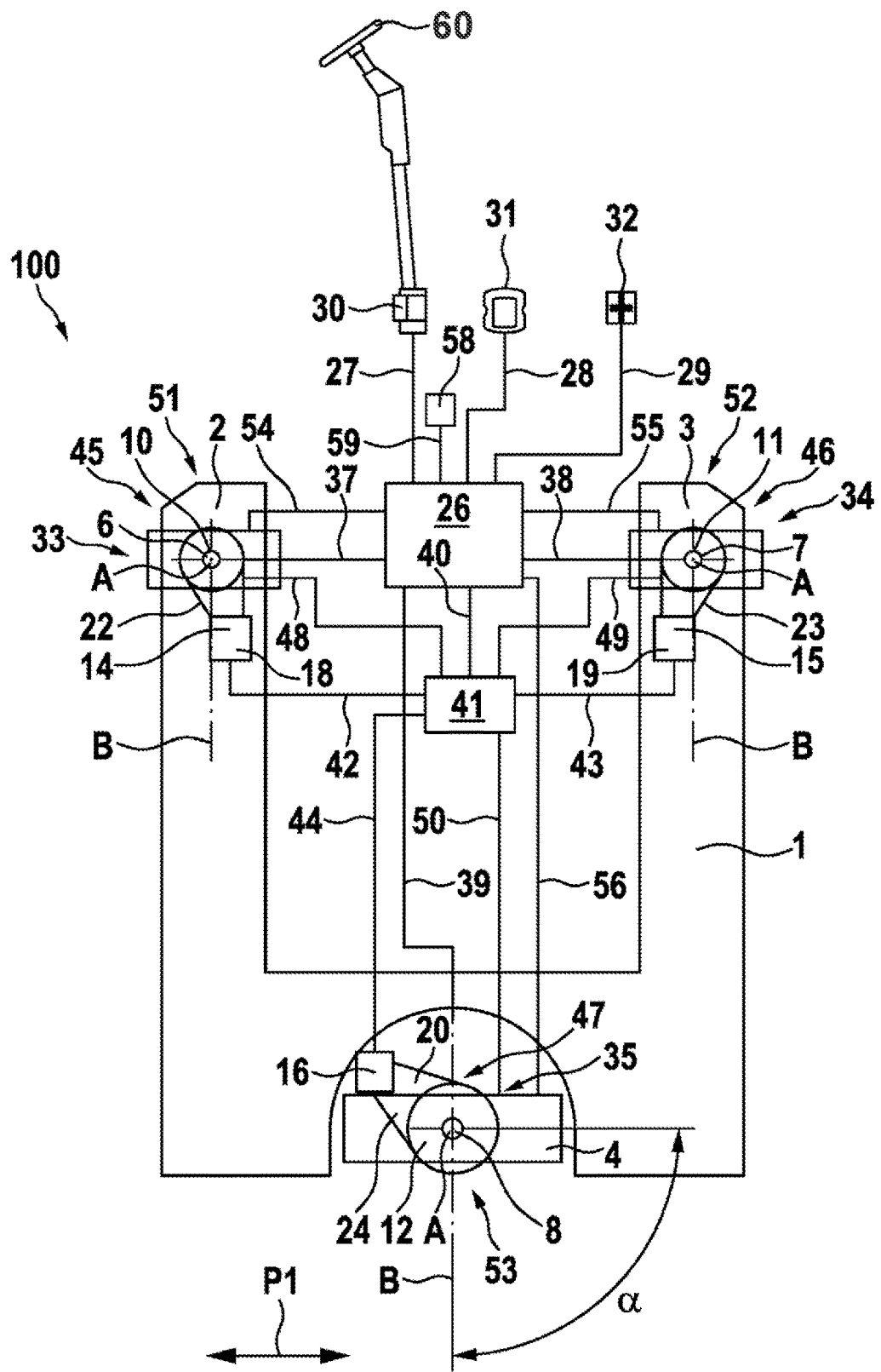
FIG. 1 is a block diagram of a steering system according to the present invention using the example of a three-wheel industrial truck in longitudinal travel.

In the steering method according to the present invention, depending on the determined difference between the detected angular positions, at least one of the at least three steered wheels and the angle setpoint values provided by the steering computer are controlled by an electrical power electronics unit, and each steering motor is supplied with the electrical energy required to reduce the difference. According to the present invention, the steering motors are no longer driven hydraulically, but electrically.

The drive can, for example, also operated electrically. Each driven wheel can, for example, be assigned its own, electrically operated drive motor. The drive then comprises a number of electric motors that corresponds to the number of driven wheels.

A manually actuatable steering transmitter can, for example, be connected to the steering setpoint value transmitter. The angle setpoint values are thereby influenced when the steering transmitter is actuated. The steering transmitter can in particular be a steering wheel or a joystick.

In order to reduce the risk that an industrial truck steered with the aid of the steering method according to the present invention is not appropriately steered at the corresponding driving velocity, which could result in difficult or uncontrollable driving conditions, the traction motor or traction motors can, for example, also be powered with electrical power with the aid of the power electronics unit, which power is limited to the maximum permissible drive power depending on the angle setpoint values.

In a development of the steering method according to the present invention, the angular positions of the at least three motor-steerable wheels can, for example, be steered based on selectable steering programs.

In a development of the steering method according to the present invention, the drive of the industrial truck can, for example, be deactivated while a steering program is being selected. Alternatively or additionally, the steering transmitter can, for example, also be deactivated while a steering program is being selected, i.e., actuation of the steering transmitter, for example, turning the steering wheel, does not result in at least one of the steering motors being supplied with electrical power. The operational safety of the industrial truck is thereby increased.

In an embodiment of the steering method according to the present invention, the selectable steering programs can, for example, comprise a longitudinal travel program and a transverse travel program. The longitudinal and transverse travel programs differ in that the neutral positions of all wheels differ from one another by angular positions of 90°.

A choice can, for example, be made between the "front-axle steering," the "rear-axle steering," and the "all-wheel steering" steering sub-programs in the longitudinal travel program and/or in the transverse travel program. "Front-axle steering" is a steering sub-program in which only the wheels of the front axle in the forward direction of travel are steered due to an actuation of the steering transmitter, for example, a rotation of the steering wheel. Accordingly, "rear-axle steering" is a steering sub-program in which, when the steering transmitter is actuated, only the wheels of the rear axle viewed in the forward direction of travel are steered. In the "all-wheel steering" sub-program, all wheels of the industrial truck are accordingly steered when the steering transmitter is actuated.

A development of the steering method according to the present invention is, for example, where the selectable steering programs comprise a carousel travel program and/or a diagonal travel program and/or a parking program. In the carousel travel program, all wheels are brought into angular positions which, when the industrial truck is driven, result in a rotation of the wheels about a pivot point that lies within a base area of the industrial truck. In the so-called "parking program," steered wheels of the industrial truck are brought into angular positions in which a shift of the industrial truck relative to the ground is not possible without overcoming the friction of the wheels on the ground, so the truck is prevented from shifting relative to the ground even without a braking effect due to the wheel positions.

In a development of the steering method according to the present invention, when the longitudinal travel program is selected, the steering angles of all steered wheels can, for example, be controlled to angular positions of 0°, when the transverse travel program is selected, they can, for example, be controlled to angular positions of 90°, and when the carousel travel program or the parking program are selected, the respective angular positions required by the steered wheels can, for example, be controlled directly.

In a development of the steering method according to the present invention, a steering pole, in which the axes of rotation of the wheels intersect when the industrial truck moves in a straight line, can, for example, be continuously displaceable with a control element provided in addition to the steering transmitter. In this steering method, the boundaries between longitudinal travel and transverse travel programs disappear and the industrial truck can be maneuvered in a particularly variable manner without interrupting the vehicle position.

Undesirably uncontrolled driving conditions can be prevented if the steering method is, for example, designed so that, in the event of an unexpected difference between the angular position thereof and the angle setpoint value thereof determined on one wheel of the steerable wheels, the electrical power electronics unit is controlled so that the steering of this steerable wheel and possibly any other steerable wheel belonging to the same axle is switched off and the industrial truck is braked in a controlled manner. This development of the steering method increases the operational safety of an appropriately equipped industrial truck.

To further improve the operational safety of the industrial truck, it is further advantageous to design the steering method thereof so that, in the event of an unexpected difference between the angular position thereof and the angle setpoint value thereof, which difference is determined on one wheel of the steerable wheels and could result in a critical driving state, the drive of the industrial truck is switched off, for example, by interrupting the application of the electric traction motors with electrical power.

In the steering system for an industrial truck for carrying out the steering method described above, the steering motors are designed according to the present invention as electric motors, for example, as AC motors or as synchronous motors.

A power electronics unit that applies electrical power to the steering motors can then, for example, be designed so that it is suitable for controlling both AC motors and synchronous motors. A modular structure of a steering system is thus possible without having to provide different power electronics units for this purpose. Irrespective thereof, the power electronics unit can, for example, be designed so that it also serves to apply electrical power to at least one traction motor of the industrial truck, it being possible to influence the power level via an accelerator, for example, an "accelerator pedal."

In order to provide the steerability of each steered wheel even when the assigned traction motor is subjected to maximum electrical power, the maximum power ("nominal power") of the corresponding steering motor can, for example be between 10% and 50%, for example, between 20% and 40%, for example, between 25% and 35%, of the maximum power ("nominal power") of the drive motor. In the case of an industrial truck with four steerable wheels, two of which are driven with the aid of a drive motor each and which has a dead weight of around seven tons when ready for operation, each steering motor can, for example, have a power output of around 1 kW and each traction motor can, for example, have a power output of around 4 kW.

The steering computer can, for example, comprise a device for storing a plurality of steering programs.

A steering angle sensor, for example, designed as an electrical or electronic steering angle sensor, can, for example, be assigned to each steerable wheel. This allows the angular position of each wheel to be detected in a particularly simple and reliable manner.

The steering setpoint value transmitter can, for example, comprise a pulse output at which electrical pulses are generated, the number of which depends on the actuation of the steering transmitter, in particular the angle of rotation of a steering wheel, and possibly on a control element provided in addition to the steering transmitter, for example, a joystick.

In a development of the steering system according to the present invention, angular positions of the steered wheels of at least 0°≤angular position≤360° can, for example, be achieved; i.e., the steerable wheels are provided to be steerable by at least 360° about a corresponding steering axle.

In the steering system according to the present invention, the steering motors can, for example, be designed as rotation motors, each with a drive shaft, the drive shaft being operatively connected via a flexible traction means or a gear drive with a steering shaft that defines a steering axle. In a steering system designed in this way, it is technologically comparatively simple to be able to turn each steerable wheel by at least 360° about its associated steering axle.

The present invention also relates to an industrial truck having a steering system as described above.

The present invention will be explained in greater detail below under reference to embodiments as shown in the drawings.

FIG. 1 schematically shows an industrial truck 100, which comprises a frame 1, which is approximately U-shaped in plan view, and three wheels 2, 3, 4 which are mounted thereon so as to be steerable about steering axles A. All wheels 2, 3, 4 are aligned in FIG. 1 so that their wheel axles B extend parallel to one another. These wheel positions correspond to a straight travel of the industrial truck 100 in the longitudinal direction of travel, which is symbolized by the arrow P1.

The steering axles A of the wheels 2, 3, 4 are formed by steering shafts 6, 7, 8, with which each wheel is non-rotatably connected with respect to the steering axles A via a wheel carrier (which is not shown in the drawings).

A turntable 10, 11, 12 is non-rotatably fastened to each steering shaft 6, 7, 8. For each of the wheels 2, 3, 4, a steering motor 14, 15, 16 is provided, each with a drive shaft which likewise carry a turntable 18, 19, 20. To transmit torque for the purpose of steering each wheel 2, 3, 4, the turntables 18, 19, 20 of the steering motors 14, 15, 16 are each connected to the turntables 10, 11, 12 via flexible traction device 22, 23, 24. The flexible traction device 22, 23, 24 can, for example, be chains or toothed belts. The turntables 10, 11, 12; 18, 19, 20 are adapted to each flexible traction device 22, 23, 24.

The steering motors 14, 15, 16 are designed as electric motors, in particular as AC motors or as synchronous motors, and form part of a steering system of the industrial truck 100.

The steering system also comprises a steering computer 26 to which a steering setpoint value transmitter 30, an input field 31, and a control element 32 which is designed as a joystick, are connected via data lines 27, 28, 29. The steering setpoint value transmitter 30 is coupled to a steering wheel 60.

Each wheel 2, 3, 4 is assigned a steering angle sensor 33, 34, 35 (which is not shown in detail in the drawings) which is designed as an electronic steering angle sensor and which detects the current steering angle position α of each wheel 2, 3, 4. In the longitudinal travel illustrated in FIG. 1, the steering angle positions are α=0°, and, in the transverse travel shown in FIG. 2, they are α=90°. The steering angles detected by the steering angle sensors 33, 34, 35 are provided to the steering computer 26 via data lines 37, 38, 39.

The steering computer 26 is connected to a power electronics unit 41 via a control line 40.

The steering motors 14, 15, 16 are connected to the power electronics unit 41 via electrical power lines 42, 43, 44.

Figure 2:
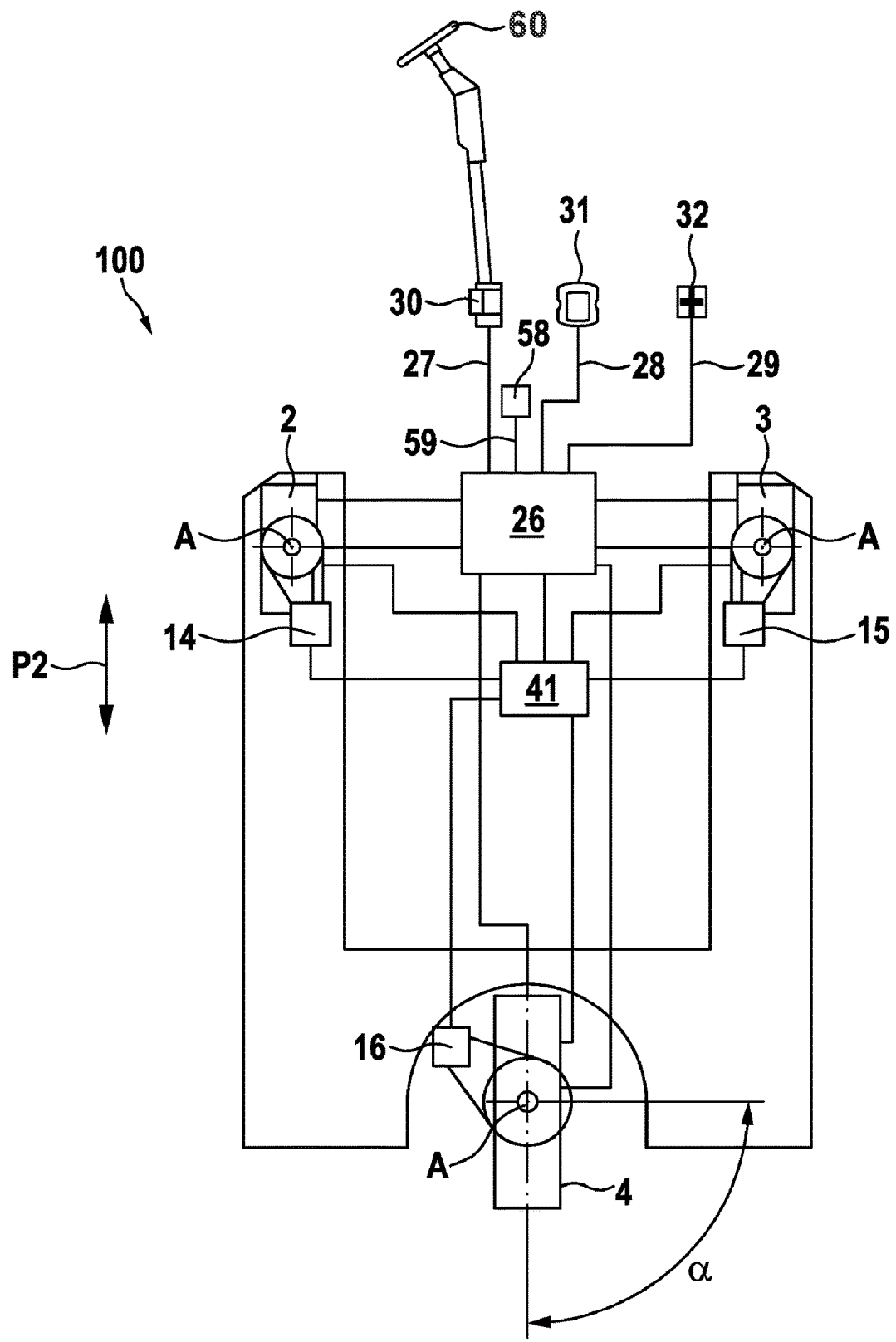
FIG. 2 is the same block diagram of the steering system using the example of the same industrial truck in transverse travel.

In the embodiment shown in FIGS. 1 and 2, each of the steerable wheels 2, 3, 4 is assigned a separate, electric traction motor 45, 46, 47, which cannot be seen in detail in the drawings. The traction motors 45, 46, 47 are connected to the power electronics unit 41 via power lines 48, 49, 50. It is also, however, possible to assign a drive motor only to some of the steerable wheels, for example, only to the center wheel 4, and to design the remaining wheels 2, 3 to run freely. To influence the electrical power with which the traction motors are applied, an accelerator pedal 58 is provided, which is connected to the steering computer 26 via a data line.

A wheel speed sensor 51, 52, 53 (which again cannot be seen in the drawings) is assigned to each of the wheels 2, 3, 4. Each wheel speed sensor 51, 52, 53 is connected to the steering computer via a data line 54, 55, 56.

As set forth above, the industrial truck 100 is shown in FIG. 1 in the longitudinal direction of travel thereof symbolized by the arrow P1. In order to initiate the longitudinal direction of travel P1, a "longitudinal travel program" stored in the steering computer 26 is activated with the input field 31.

FIG. 2 shows the same industrial truck 100 after a "transverse travel program" stored in the steering computer 26 is selected with the aid of the input field 31. As can be seen by comparing FIGS. 1 and 2, the wheels 2, 3, 4 were rotated by a steering angle α of 90° with the aid of the steering motors 14, 15, 16 about the respective longitudinal axis A so that the industrial truck 100, if it is driven, now moves in the transverse direction of travel which is symbolized by the arrow P2.

Figure 3:
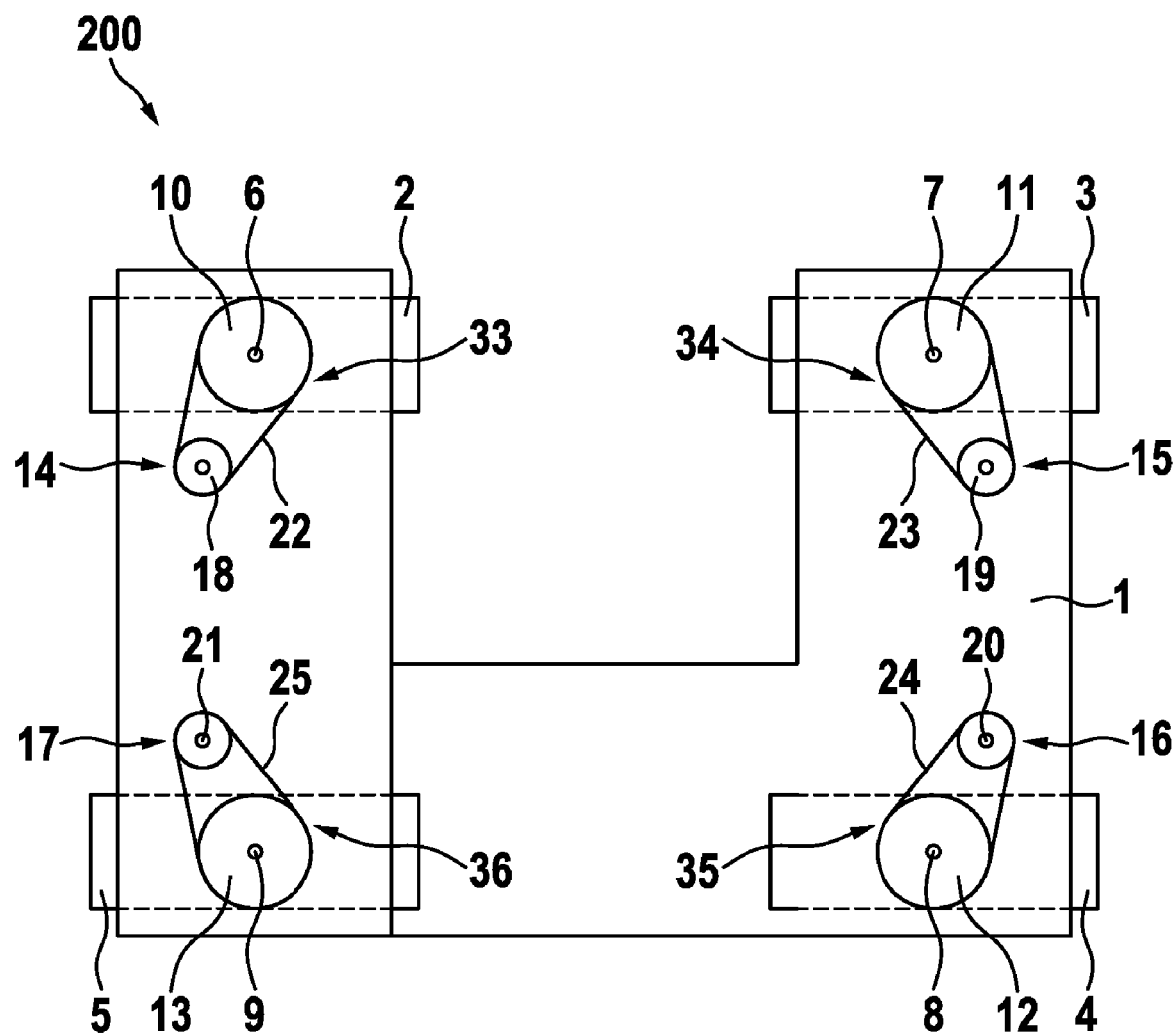
FIG. 3 is a view of the arrangement of steering motors and wheel arrangements of a four-wheeled industrial truck.

FIG. 3 shows a view of the arrangement of steering motors and wheel arrangements of a four-wheeled industrial truck in a schematic plan view. In contrast to the industrial truck described with reference to FIGS. 1 and 2, the industrial truck 200 according to this embodiment comprises, in addition to the three wheels 2, 3, 4, a fourth wheel 5, which is rotatably mounted on the frame 1 via steering shaft 9 about a steering axle A. The wheels 2, 3, 4, 5 are arranged on this four-wheeled industrial truck 200 at the corners of a rectangle. A turntable 13 is in turn non-rotatably fastened to the steering shaft 9. A fourth steering motor 17 is provided with a turntable 21 which is non-rotatably fastened to a drive shaft of the steering motor 17. A flexible traction device 25 is again provided for the transmission of torques between the turntable 21 and the turntable 13. A steering angle sensor 36 is also assigned to the fourth wheel 5.

The arrangements, design, and functionality of the fourth wheel 5 and the components described above correspond to those of the industrial truck 100 described with reference to FIGS. 1 and 2, so that reference is made to the description thereof in order to avoid repetition. The industrial truck 200 also comprises the other components shown in FIGS. 1 and 2, such as the steering setpoint value transmitter 30, the steering wheel 60, the input field 31, the control element 32, the steering computer 26, and the power electronics unit 41 together with the associated data lines and power lines, wherein, in the case of the industrial truck 200, additional data lines and power lines (which are not shown in the drawing) are provided for the arrangement of the fourth wheel 5. Each of the wheels 2, 3, 4, 5 in industrial truck 200 is also assigned a drive motor, which drive motor is configured in the same way as the traction motors 45, 46, 47 in the embodiment of the industrial truck 100 and which can be supplied with electrical power. In a four-wheeled industrial truck, it is again also possible to assign only some of the wheels, for example, the wheels 4, 5, to traction motors.

Figure 4:
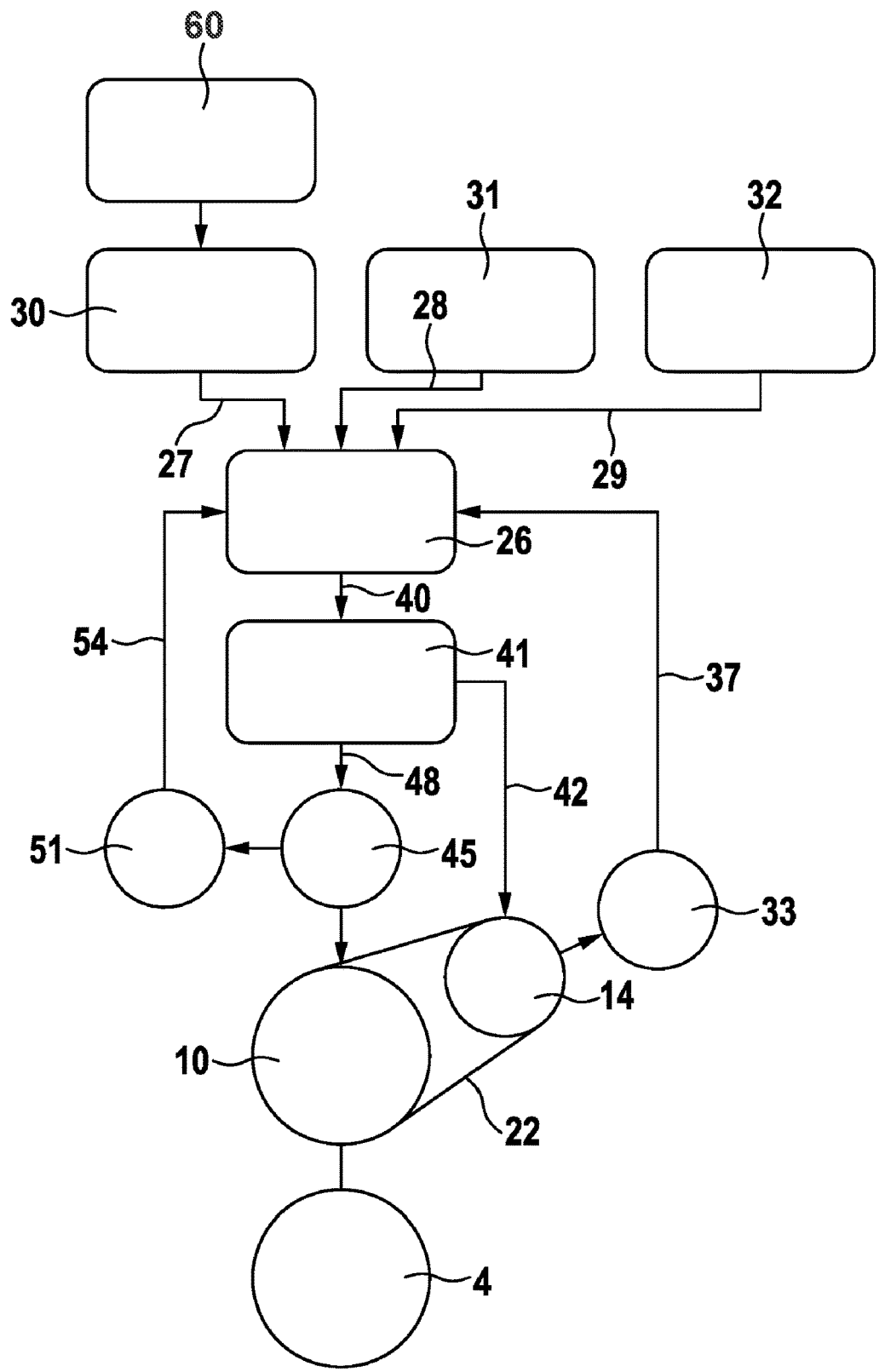
FIG. 4 is a basic illustration of a signal flow plan of a steered wheel, the steering motor being coupled via a flexible traction device to a steering shaft.

FIG. 4 is a basic illustration of a signal flow plan as it is implemented for each of the steered and driven wheels, using the example of wheel 4.

Figure 5:
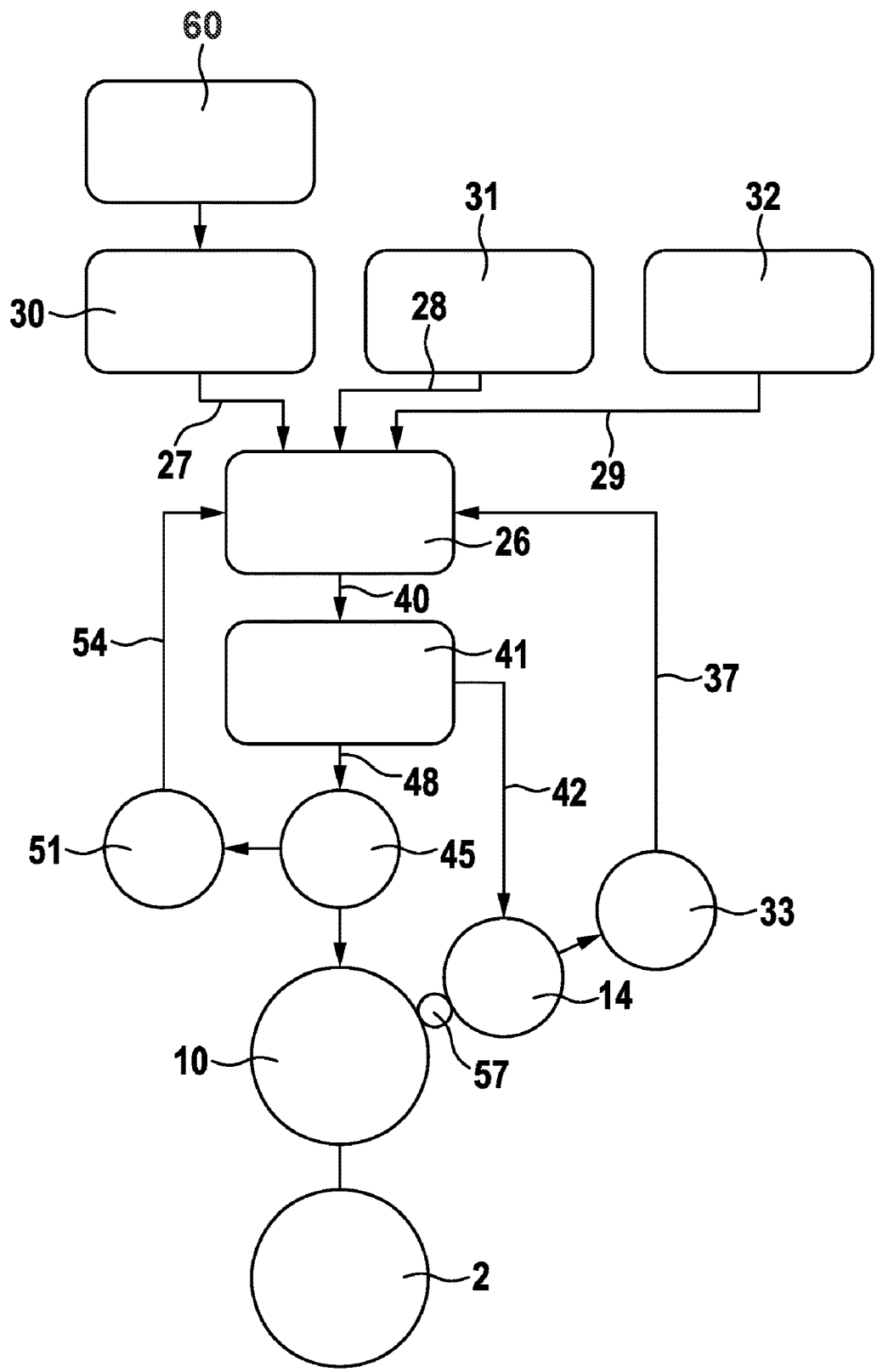
FIG. 5 is a representation corresponding to FIG. 4; the steering motor, however, being connected to the steering shaft via a gear mechanism.

FIG. 5 is a further basic illustration of a signal flow plan of a steered and driven wheel using the example of wheel 4, which corresponds to the illustration according to FIG. 4. The only difference is that the steering motor 14 is not coupled to the turntable 10 and thus to the corresponding steering shaft via a flexible traction device 22, but rather via a spur gear 57.

In the embodiment described, various steering programs are stored in the steering computer 26, which can be selected, for example, with the aid of the input field 31. The steering computer 26 is programmed so that a parameterized standard steering program is activated after the steering system has been switched on. The steered wheels remain in the angular position when the steering system is switched on and are only deflected after the direction of travel has been preselected.

The steering computer is also programmed so that the selection of a steering program, for example with the aid of the input field, can only be enabled under specific conditions. During such a programming of the steering computer, for example, the industrial truck must be stationary, the selected steering program must be enabled, the steering must be active, and any previous emergency shutdown must have been quitted.

After a steering program has been activated, the power electronics unit 41 is controlled by the steering computer 26 via the control line 40 so that the steered wheels are steered into the angular positions corresponding to the direction of travel. The angular positions of the steered wheels are detected with the steering angle sensors 33, 34, 35, 36 and compared with that position given by the steering computer 26 depending on the selected steering program. The steering motors are controlled in order to minimize the setpoint/actual value difference.

During a steering program selection, the power electronics unit 41 is controlled by the steering computer 26 so that the traction motors are not activated. Any data transmitted by the steering setpoint value transmitter are also not taken into account. In other words, the steering wheel is not active in this state.

Figures 6, 7:
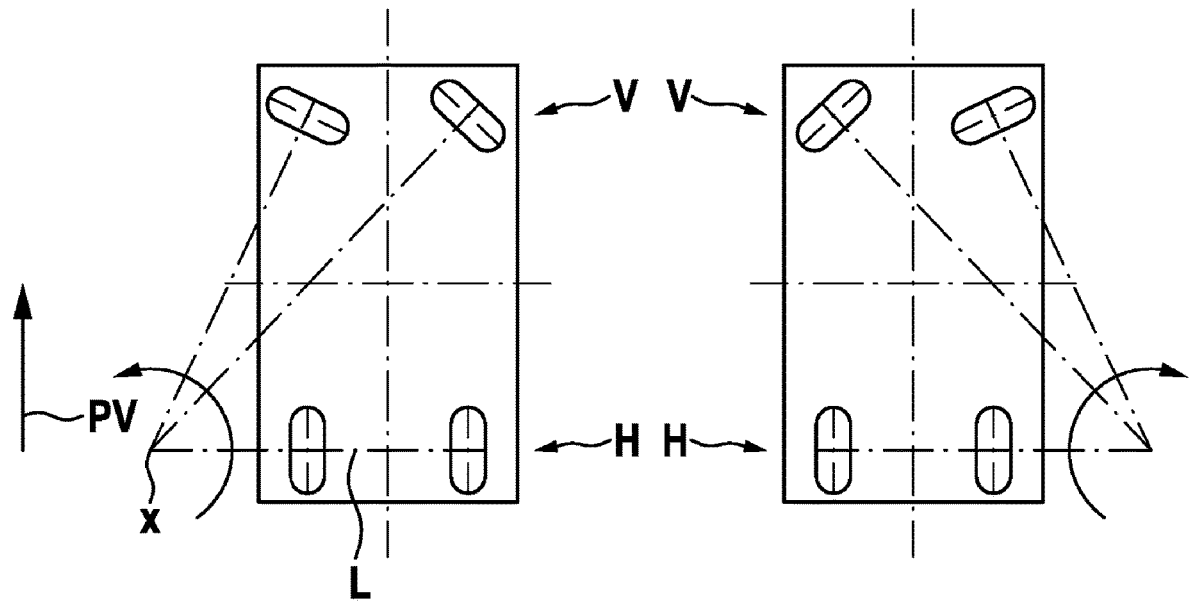
FIG. 6 shows a first view of the functionality of a "front-axle steering, transverse travel" steering program.
FIG. 7 shows a second view of the functionality of a "front-axle steering, transverse travel" steering program.

The steering computer can in particular have the following steering programs:

a) Front-axle steering, transverse travel, shown in FIGS. 6 and 7.

Figures 8, 9:
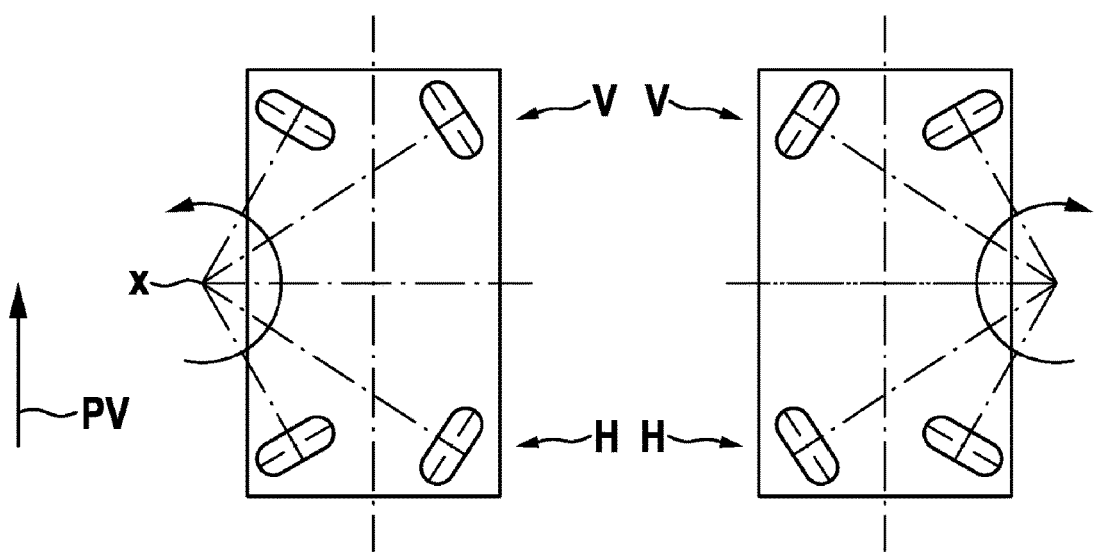
FIG. 8 shows a first view of the functionality of an "all-wheel steering, transverse travel" steering program.
FIG. 9 shows a second view of the functionality of an "all-wheel steering, transverse travel" steering program.

In the case of front-axle steering, only the wheels of the axle that forms the front axle V with respect to the forward direction PV are steered. The steering geometry is comparable to that of a four-wheeled car. For precise steering, the steering line L must run exactly through the rear axle H, as can be seen in FIGS. 6 and 7. Depending on the actuation of the steering transmitter, the steered front wheels are shifted into angular positions so that their axes of rotation intersect in a steering pole X. This steering pole X is always on the steering line L.

b) Transverse travel, all-wheel steering, shown in FIGS. 8 and 9.

Figures 10, 11:
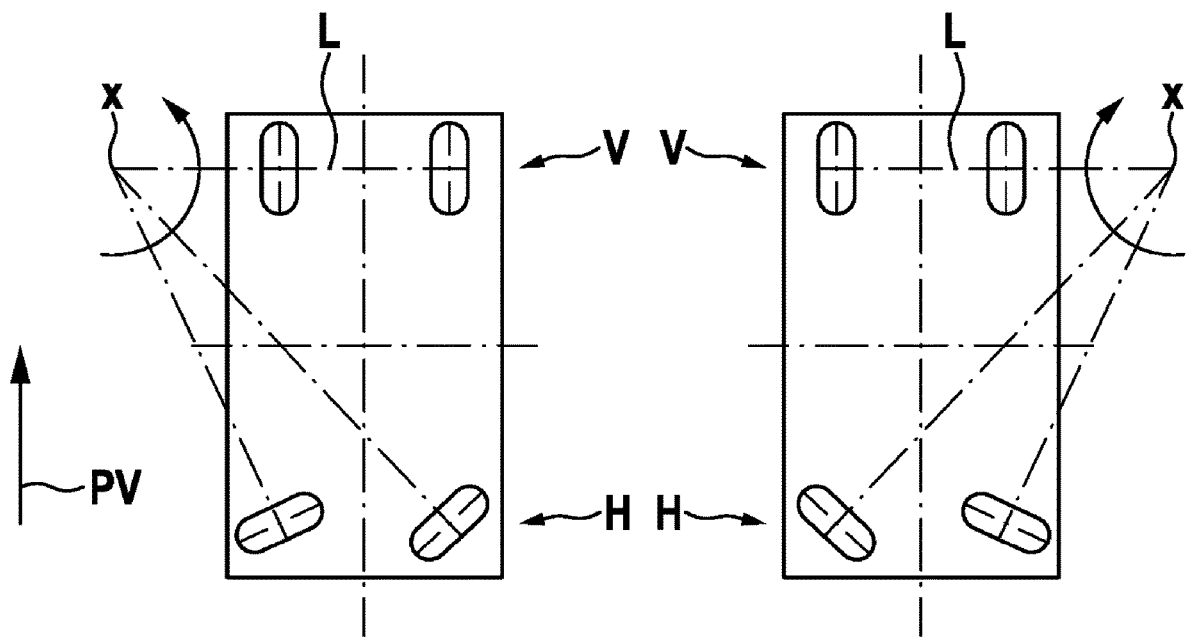
FIG. 10 shows a first view of the functionality of a "rear axle steering, transverse travel" steering program.
FIG. 11 shows a second view of the functionality of a "rear axle steering, transverse travel" steering program.

With this steering program, all wheels are steered depending on the steering transmitter. Their axes of rotation must all intersect in a common steering pole X hen cornering.

c) Transverse travel, rear-axle steering, shown in FIGS. 10 and 11.

Figures 12, 13:
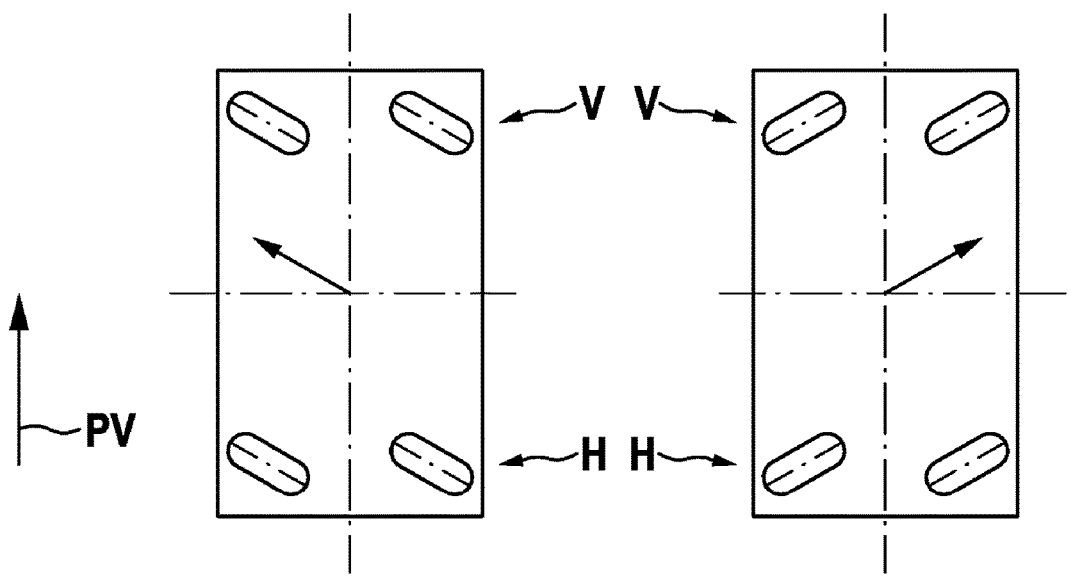
FIG. 12 shows a first view of the functionality of a "diagonal steering, transverse travel" steering program.
FIG. 13 shows a second view of the functionality of a "diagonal steering, transverse travel" steering program.

In this steering program, only the wheels of the rear axle H that are on the rear with respect to the forward/transverse direction of travel are steered. The steering pole X lies on a steering line L which coincides with the front axle V.

d) Transverse travel, diagonal steering, shown in FIGS. 12 and 13.

Figure 14:
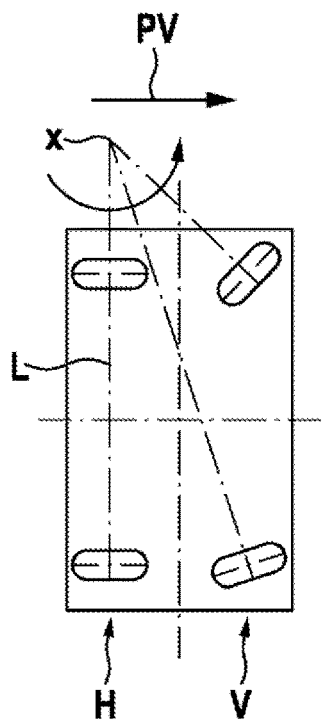
FIG. 14 shows a first view of the functionality of a "front-axle steering, longitudinal travel" steering program.
Figure 15:
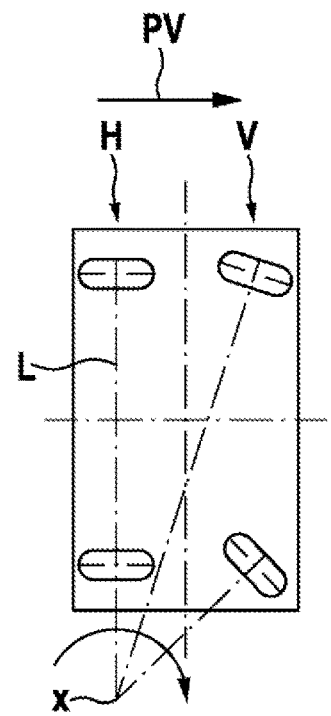
FIG. 15 shows a second view of the functionality of a "front-axle steering, longitudinal travel" steering program.

Depending on the actuation of the steering transmitter, all wheels are steered in identical angular positions, so that the direction of travel of the vehicle changes without changing the orientation thereof.

e) Front-axle steering, longitudinal travel, shown in FIGS. 14 and 15.

This steering program corresponds to that of the front-axle steering, transverse drive steering program, but the direction of travel differs by 90° compared to the transverse travel.

Figure 16:
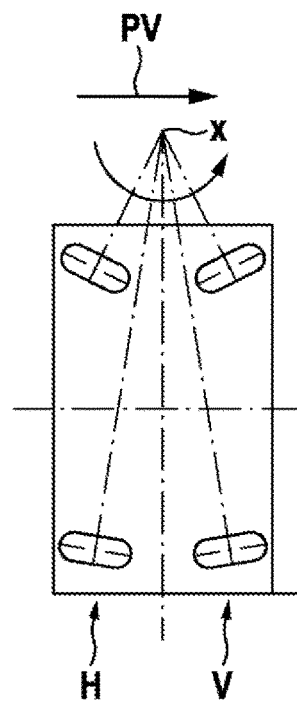
FIG. 16 shows a first view of the functionality of an "all-wheel steering, longitudinal travel" steering program.
Figure 17:
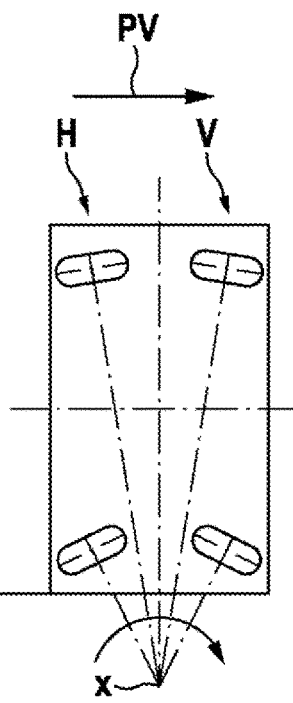
FIG. 17 shows a second view of the functionality of an "all-wheel steering, longitudinal travel" steering program.
Figure 22:
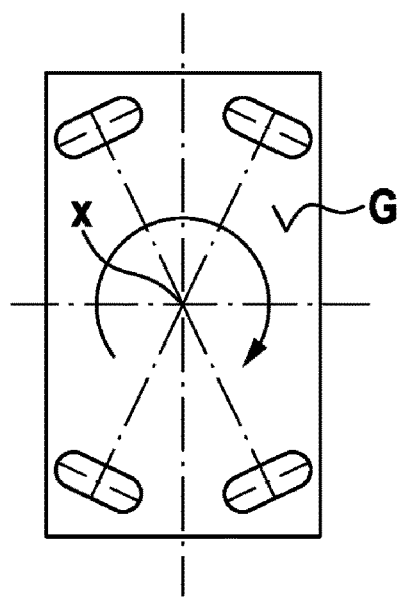
FIG. 22 shows the functionality of a "carousel travel" steering program.

The same applies analogously to the steering programs longitudinal travel, all-wheel steering, shown in FIGS. 16 and 17, longitudinal travel, rear-axle steering, shown in FIGS. 18 and 19, and longitudinal travel, diagonal direction, shown in FIGS. 20 and 21.

f) Carousel travel, shown in FIG. 22.

Figure 23:
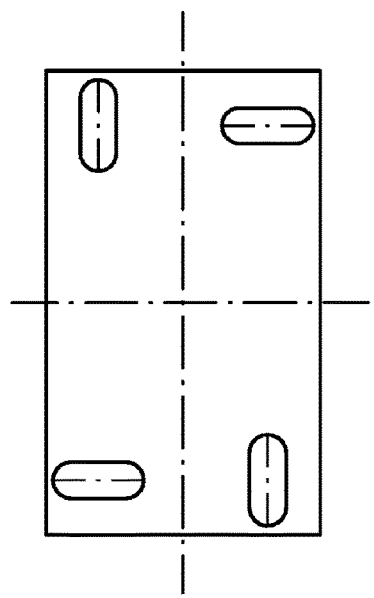
FIG. 23 shows the functionality of a "parking program"

In this steering program, the steering pole X, in which the axis of rotation of the wheels intersect, lies within a base area G of the industrial truck.

g) Parking program shown in FIG. 23.

Figure 24:
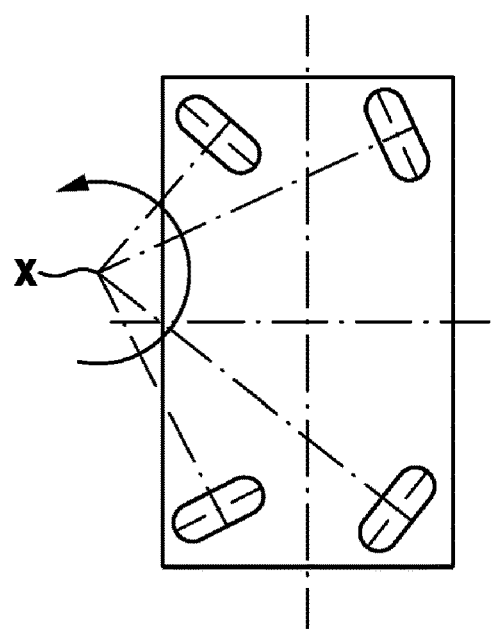
FIG. 24 shows a first view of the functionality of an "all-wheel-variable" steering program in which the steering pole, when the axes of rotation of the wheels intersect when cornering, can be continuously shifted with the aid of a separate steering element.
Figure 25:
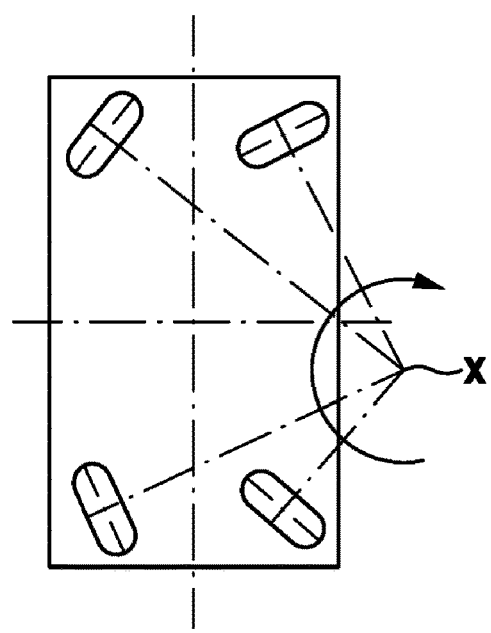
FIG. 25 shows a second view of the functionality of an "all-wheel-variable" steering program in which the steering pole, when the axes of rotation of the wheels intersect when cornering, can be continuously shifted with the aid of a separate steering element.
Figure 26:
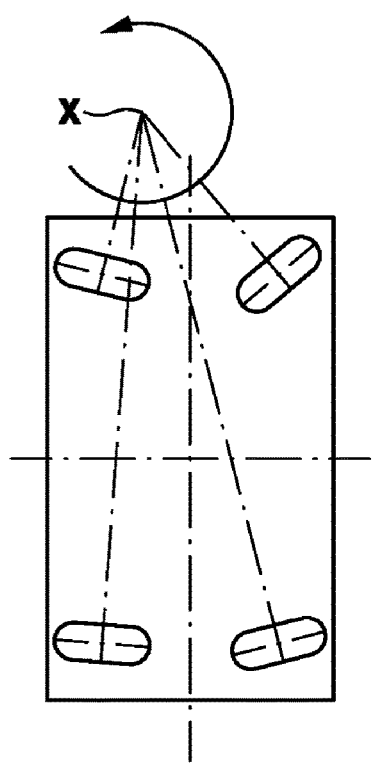
FIG. 26 shows a third view of the functionality of an "all-wheel-variable" steering program in which the steering pole, when the axes of rotation of the wheels intersect when cornering, can be continuously shifted with the aid of a separate steering element.

In the parking program, the wheels are brought into a pre-programmed angular position completely independently of one another so that the industrial truck is secured against rolling away even without the use of the brakes.

h) Variable all-wheel steering, shown in FIGS. 24-26.

This steering program initially corresponds to the steering program all-wheel steering. With the aid of the additional control element 32 connected to the steering computer 26, which can be designed as a joystick, for example, the steering pole can now, for example, be shifted continuously so that the industrial truck can be maneuvered in a particularly variable manner without interrupting the driving state. All wheels can be rotated by 360° about the steering axles A for this purpose.

In the embodiments described, the steering computer can be designed so that different devices can be selected as steering setpoint value transmitters, however, they must always have a pulse output (apart from operation via a radio remote control in which the steering setpoint value transmitter would not be activated). The following parameters can, for example, be selected:

1. Pulse output Clock/UpDown or A/B track:

If the parameter "Pulse output Clock/UpDown" is selected, the steering computer is adapted to a steering setpoint value transmitter, the pulses of which contain information about the steering direction, for example, the direction of rotation of the steering wheel.

If the "A/B-track" parameter is selected, the steering computer is adapted to a steering setpoint value transmitter that generates pulses on two tracks A and B that are offset by 90°. The steering computer recognizes the steering direction, for example, the direction of rotation of the steering wheel, on the basis of the signal sequence received from the steering setpoint value transmitter.

2. Number of pulses generated by the steering setpoint value transmitter per steering wheel turn.

3. Direction of rotation.

The steering computer is also designed so that, when the steering transmitter is actuated, for example, when the steering wheel is turned, the generated pulses are counted by the steering computer and processed into an absolute steering setpoint value. From the parameters of the axle coordinates and the selected steering program, the steering computer calculates the required angle setpoint values of the steered wheels to achieve the desired change in direction.

The angular positions of the wheels steered with the aid of electric AC motors or synchronous motors are detected via the steering angle sensors 33, 34, 35, 36, which can be designed as potentiometric steering angle sensors. The actual angle of each steered wheel is calculated from the potentiometric signals and stored adjustment values. The steering computer compares the angular position (actual angle) thus determined with the angle setpoint value determined for each selected steering program based on the steering setpoint value determined angle setpoint with the angular position. On the basis of the setpoint/actual value difference, the power electronics unit 41 is controlled by the steering computer 26 so that it actuates the steering motor in the sense of a setpoint/actual value compensation.

If an error occurs with a steered wheel of a steering axle, for example, no angular position is transmitted, the steering operations of the steered wheels of this axle are deactivated and the steered wheels can, for example, be set into a neutral position by a corresponding routine stored in the steering computer, which correspond, for example, to their starting angular positions or straight-ahead driving positions. The steered wheels of the other, unaffected axles, however, remain active and allow steering corrections to be carried out in this way. The steering computer also contains a routine that controlled the power electronics unit in the event of every critical error in the steering so that the industrial truck is completely stopped.

The present invention is not limited to embodiments described herein; reference should be had to the appended claims.

LIST OF REFERENCE NUMERALS 100, 200 Industrial truck
1 Frame
2, 3 Wheel
4 Center wheel/Wheel
5 Fourth wheel
6, 7, 8, 9 Steering shaft
10, 11, 12, 13 Turntable
14, 15, 16, 17 Steering motor
18, 19, 20, 21 Turntable
22, 23, 24, 25 Flexible traction means
26 Steering computer
27, 28, 29 Data lines
30 Steering setpoint value transmitter
31 Input field
32 Control element
33, 34, 35, 36 Steering angle sensor
37, 38, 39 Data lines
40 Control line
41 Power electronics unit
42, 43, 44 Power lines
45, 46, 47 Traction motor
48, 49, 50 Power lines
51, 52, 53 Wheel speed sensors
54, 55, 56 Data lines
57 Spur gear
58 Accelerator pedal
59 Data line
60 Steering wheel
A Steering axles
B Wheel axles
G Base area
H Rear axle
P1 Longitudinal direction of travel
P2 Transverse direction of travel
PV Forward direction of travel
L Steering line
V Front axle
X Steering pole
α Angle

What is claimed is:

1. A steering method of an industrial truck, wherein the industrial truck comprises:
a drive;
at least three steerable wheels;
at least one steering setpoint value transmitter which is configured to steer at least one of the at least three steerable wheels;
a steering computer which is configured to provide angle setpoint values; and
an electrical power electronics unit which is configured to supply an electrical energy to a steering motor which is associated with the at least one steered wheel of the at least three steerable wheels,
the method comprising:
steering, via the at least one steering setpoint value transmitter, at least one steered wheel of the at least three steerable wheels;
detecting angular positions of the at least one steered wheel of the at least three steerable wheels;
providing the angle setpoint values via the steering computer;
comparing the angular positions of the at least one steered wheel of the at least three steerable wheels with the angle setpoint values provided via the steering computer so as to determine a setpoint/actual value difference;

controlling the electrical power electronics unit based on the setpoint/actual value difference;

steering the angular positions of the at least one steered wheel of the at least three steerable wheels based on preselectable steering programs; and deactivating the at least one steering setpoint value transmitter while selecting one of the preselectable steering programs.

2. The steering method as recited in claim 1, further comprising:

deactivating the drive while selecting one of the preselectable steering programs.

3. The steering method as recited in claim 1, wherein the preselectable steering programs comprise a longitudinal travel program and a transverse travel program.

4. The steering method as recited in claim 3, wherein, each of the longitudinal travel program and the transverse travel program comprise sub-programs which include a front-axle steering sub-program, a rear-axle steering sub-program, and an all-wheel steering sub-program, and the method further comprises:

choosing between the front-axle steering sub-program, the rear-axle steering sub-program, and the all-wheel steering sub-program in at least one of the longitudinal travel program and the transverse travel program.

5. The steering method as recited in claim 3, wherein the preselectable steering programs further comprise at least one of a carousel travel program, a diagonal travel program, and a parking program.

6. The steering method as recited in claim 5, wherein, when the longitudinal travel program is selected, a steering angle of all steered wheels of the at least three steerable wheels are set to an angular position of 0°, when the transverse travel program is selected, the steering angle of all steered wheels of the at least three steerable wheels are set to an angular position of 90°, and when the carousel travel program or the parking program are selected, the respective angular positions required by the steered wheels of the at least three steerable wheels are controllable without the steering setpoint value transmitter having to be actuated.

7. The steering method as recited in claim 1, wherein, if a malfunction with respect to the one steered wheel of the at least three steerable wheels of an axle is detected, the method further comprises:

shifting via the steering computer the at least steered wheel of the at least three steerable wheels of the axle which is affected and, if applicable, every other steered wheel of the at least three steerable wheels which belong to the axle which is affected, into an angular position which corresponds to a neutral position for the respectively selected preselected steering program, and then only steering those of the at least three steerable wheels that do not belong to the axle which is affected in the sense of a setpoint/actual value compensation of the angular positions of those of the at least three steerable wheels that do not belong to the axle which is affected with the corresponding angle setpoint values.

8. The steering method as recited in claim 7, further comprising:

switching off the drive of the industrial truck when an unexpected difference between the angular position and the angle setpoint value is determined on one steered wheel of the at least three steerable wheels which can result in a critical driving state of the industrial truck.

9. The steering method as recited in claim 1, wherein, the industrial truck further comprises a control element in addition to the at least one steering setpoint value transmitter, and the method further comprises:

steering all of the at least three steerable wheels and, when the industrial truck deviates from a straight line, continuously displacing, via the control element, a steering pole in which an axes of rotation of the at least three steerable wheels intersect.

10. A steering system for an industrial truck, the steering system comprising:

a steering transmitter;

a steering setpoint value transmitter which is connected to the steering transmitter; and at least three steering motors, each of which are configured to steer one steerable wheel and to perform the steering method as recited in claim 1, wherein, the at least three steering motors are designed as electric motors.

11. The steering system as recited in claim 10, wherein the at least three steering motors are further designed as AC motors.

12. The steering system as recited in claim 11, wherein the at least three steering motors are further designed as synchronous motors.

13. The steering system as recited in claim 10, wherein the steering computer comprises a device for storing a plurality of steering programs.

14. The steering system as recited in claim 10, further comprising:

a steering angle sensor which is designed as an electrical steering angle sensor or as an electronic steering angle sensor, the steering angle sensor being assigned to each steerable wheel.

15. The steering system as recited in claim 10, wherein the steering setpoint value transmitter comprises a pulse output at which electrical pulses are generated, a number of the electrical pulses depending on an actuation of the steering transmitter.

16. The steering system as recited in claim 15, wherein, the steering transmitter is a steering wheel, and the number of the electrical pulses depending on the actuation of the steering transmitter is based on an angle of rotation of the steering wheel.

17. The steering system as recited in claim 10, wherein the steering system is designed to have angular positions of the steered wheels of at least 0°≤angular position≤360°.

18. The steering system as recited in claim 10, wherein each of the at least three steering motors are designed as rotation motors which comprise a drive shaft which is operatively connected to a steering shaft via a flexible traction device or a gear transmission.

19. An industrial truck comprising the steering system as recited in claim 10.

* * * * *